(12) United States Patent
Moravek et al.

(10) Patent No.: US 10,093,829 B2
(45) Date of Patent: Oct. 9, 2018

(54) CURABLE FILM-FORMING COMPOSITIONS DEMONSTRATING BURNISH RESISTANCE AND LOW GLOSS, AND METHODS OF IMPROVING BURNISH RESISTANCE OF A SUBSTRATE

(71) Applicant: PPG INDUSTRIES OHIO, INC., Cleveland, OH (US)

(72) Inventors: Scott J. Moravek, Cranberry Township, PA (US); Lawrence G. Anderson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1610 days.

(21) Appl. No.: 13/655,823

(22) Filed: Oct. 19, 2012

(65) Prior Publication Data
US 2015/0203716 A1    Jul. 23, 2015

(51) Int. Cl.
| | |
|---|---|
| *B05D 3/02* | (2006.01) |
| *C09D 183/06* | (2006.01) |
| *C08G 18/62* | (2006.01) |
| *C08G 18/79* | (2006.01) |
| *C09D 175/04* | (2006.01) |
| *C09D 7/61* | (2018.01) |
| *C09D 7/40* | (2018.01) |
| *C08G 77/16* | (2006.01) |

(52) U.S. Cl.
CPC ....... *C09D 183/06* (2013.01); *C08G 18/6225* (2013.01); *C08G 18/792* (2013.01); *C09D 7/61* (2018.01); *C09D 7/69* (2018.01); *C09D 175/04* (2013.01); *C08G 77/16* (2013.01)

(58) Field of Classification Search
CPC .. C09D 183/06; C09D 7/1283; C09D 7/1216; C09D 175/04; C09D 7/61; C09D 7/69; C08G 77/16; C08G 18/6225; C08G 18/792
USPC ........................................................ 525/479
See application file for complete search history.

(56) References Cited

U.S. PATENT DOCUMENTS

| | | | |
|---|---|---|---|
| 4,478,876 A * | 10/1984 | Chung ..................... | C09D 4/00 427/508 |
| 6,387,519 B1 | 5/2002 | Anderson et al. | |
| 6,593,417 B1 | 7/2003 | Anderson et al. | |
| 6,610,777 B1 | 8/2003 | Anderson et al. | |
| 6,635,341 B1 | 10/2003 | Barancyk et al. | |
| 7,816,442 B2 | 10/2010 | Christian et al. | |
| 7,842,129 B2 | 11/2010 | Christian et al. | |
| 2002/0156143 A1* | 10/2002 | Sigel ..................... | C08F 283/01 522/33 |
| 2003/0207985 A1 | 6/2003 | Anderson et al. | |
| 2004/0225057 A1 | 11/2004 | Anderson et al. | |
| 2004/0249049 A1 | 12/2004 | Christian et al. | |
| 2005/0282022 A1 | 12/2005 | Christian et al. | |
| 2007/0218274 A1 | 9/2007 | Kania et al. | |
| 2008/0021147 A1 | 1/2008 | Lin | |
| 2008/0139756 A1 | 6/2008 | Christian et al. | |
| 2008/0213488 A1 | 9/2008 | Stanjek et al. | |
| 2009/0252884 A1 | 10/2009 | Hildenbrand et al. | |
| 2009/0286901 A1 | 11/2009 | Vijverberg et al. | |
| 2011/0105645 A1 | 5/2011 | Nagel et al. | |

FOREIGN PATENT DOCUMENTS

| | | |
|---|---|---|
| EP | 1388581 B1 | 6/2007 |
| JP | 4255765 | 9/1992 |
| WO | 0109259 A1 | 2/2001 |
| WO | 2005111100 A1 | 11/2005 |

* cited by examiner

*Primary Examiner* — Robert S Walters, Jr.
(74) *Attorney, Agent, or Firm* — Krisanne Shideler

(57) ABSTRACT

The present invention is directed to curable film-forming compositions comprising: (a) a polymeric binder comprising: (i) a polysiloxane having reactive functional groups and in which is dispersed protonated silica particles having an average particle size of 2 to 20 microns; and (ii) optionally, at least one additional polymeric resin different from the polysiloxane (i), having reactive functional groups; and (b) a curing agent containing functional groups that are reactive with the reactive functional groups of (i) and/or (ii). After application to a substrate as a coating and after curing, the curable film-forming composition demonstrates an initial 85° gloss of less than 30 and an increase in 85° gloss of no more than 10 gloss units when subjected to various ABRASION TEST METHODS as defined herein.

Also provided is a method of improving burnish resistance of a substrate using the curable film-forming compositions of the present invention.

20 Claims, No Drawings

CURABLE FILM-FORMING COMPOSITIONS DEMONSTRATING BURNISH RESISTANCE AND LOW GLOSS, AND METHODS OF IMPROVING BURNISH RESISTANCE OF A SUBSTRATE

FIELD OF THE INVENTION

The present invention relates generally to curable film-forming compositions that demonstrate burnish resistance and low gloss properties, and to methods of improving the burnish resistance of substrates.

BACKGROUND OF THE INVENTION

Recently a great deal of research effort in the coatings industry has been focused on mar and abrasion resistance of transparent coatings. While these two terms are often used interchangeably, the physical and mechanistic events are quite different. Mar is a near-surface phenomenon involving small scratches, usually without significant removal of material. Abrasion involves much more severe damage and often entails significant loss of coating material. As such, mar resistance is influenced primarily by surface properties while abrasion resistance is controlled by bulk properties. The chemical attributes that influence these mechanical properties are often divergent. For example, acrylic urethane clear coats can have excellent abrasion resistance but poor mar resistance. On the other hand, acrylic melamine coatings can have good mar resistance and average to poor abrasion resistance. One common example of mar damage is gloss loss on an automobile finish. The high gloss finish of a new car becomes dull and hazy with time due to fine scratches and abrasions. The majority of this damage is caused by the scrubbing action of cloths or bristles used in automatic car washes. Abrasion damage is more commonly seen in floor coatings, and in its most severe form the substrate may become exposed. Burnishing of highly pigmented coatings is less well defined in the literature but contains elements of mar and abrasion as well as interfacial adhesion. There are at least four different wearing mechanisms that can contribute to burnishing in coatings containing fillers or pigments. 1) Removal of film at the air/surface interface, 2) abstraction of the filler by cohesive binder failure, 3) abstraction of filler by adhesive failure and/or 4) filler wear. Which mechanism predominates may vary depending on the coating, abrasion conditions and outdoor exposure. Ideally a burnish resistant coating has good abrasion resistance, good mar resistance, and pigment particles with excellent compatibility with the binder.

Camouflage aircraft typically utilize low gloss pigmented coatings to achieve many of their performance requirements. These low gloss or matte finishes exhibit physically rough surfaces, which, ideally, diffusely reflect visible light. These physically rough surfaces are difficult to clean and often require scrubbing with an abrasive pad, which over time can increase the uniformity of coating reflectance, called burnishing. The increase in reflection is perceived visually as a color shift resulting in areas of higher contrast. Mechanically, this increase in gloss or burnishing is caused by abrasion of the rough paint surface producing a smoother surface with more uniform reflection.

It would be desirable to develop curable film-forming compositions which can be repeatedly cleaned with detergents and abrasives without increasing the reflectance of the coating.

SUMMARY OF THE INVENTION

The present invention is directed to curable film-forming compositions comprising:
(a) a polymeric binder comprising:
   (i) a polysiloxane having reactive functional groups and in which is dispersed protonated silica particles having an average particle size of 2 to 20 microns, wherein the polysiloxane is present in the polymeric binder in an amount of at least 10 percent by weight based on the total weight of solids in the polymeric binder; and
   (ii) optionally, at least one additional polymeric resin different from the polysiloxane (i), having reactive functional groups; and
(b) a curing agent containing functional groups that are reactive with the reactive functional groups of (i), (ii), or both. After application to a substrate as a coating and after curing, the curable film-forming composition demonstrates an initial 85° gloss of less than 30 and an increase in 85° gloss of no more than 10 gloss units, or alternatively, 50 percent when subjected to various ABRASION TEST METHODS as defined herein.

Also provided is a method of improving burnish resistance of a substrate, comprising: (1) applying to the substrate the curable film-forming composition described above to form a coated substrate, and (2) heating the coated substrate, if necessary, to a temperature and for a time sufficient to cure the curable film-forming composition.

DETAILED DESCRIPTION OF THE INVENTION

It is noted that, as used in this specification and the appended claims, the singular forms "a," "an," and "the" include plural referents unless expressly and unequivocally limited to one referent.

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

The various embodiments and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their C1-C5 alkyl esters, lower alkyl-substituted acrylic acids, e.g., C1-C5 substituted acrylic acids, such as methacrylic acid, ethacrylic acid, etc., and their C1-C5 alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The term "burnish resistant" refers to an ability of a coating to maintain its gloss without demonstrating a significant increase (i.e., less than 15 points) in gloss after scrubbing with an abrasive material or pad.

The present invention is directed to curable film-forming compositions. The film-forming compositions comprise (a) a polymeric binder comprising (i) a polysiloxane having reactive functional groups. Examples of reactive functional groups include hydroxyl groups, carbamate groups, carboxyl groups, isocyanate groups, carboxylate groups, primary amine groups, secondary amine groups, amide groups, urea groups, urethane groups, epoxy groups, and combinations thereof.

The polysiloxane may comprise at least one of the following structural units (I):

wherein each $R^1$, which may be identical or different, represents H, OH, a monovalent hydrocarbon group, and a monovalent siloxane group; each $R^2$, which may be identical or different, represents a group comprising at least one reactive functional group. Each of m and n depicted in the structural unit (I) above fulfills the requirements of $0<n<4$, $0<m<4$ and $2\leq(m+n)<4$. When (m+n) is 3, the value represented by n can be 2 and the value represented by m is 1. Likewise, when (m+n) is 2, the value represented by each of n and m is 1.

The term "polymer" is meant to encompass oligomers, and includes without limitation both homopolymers and copolymers. It should also be understood that the polysiloxane can include linear, branched, dendritic or cyclic polysiloxanes.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example a monovalent group on the polysiloxane will form one single covalent bond to a silicon atom in the backbone of the polysiloxane polymer. As used herein, "hydrocarbon groups" are intended to encompass both branched and unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example oxygen, nitrogen, and halogen atoms.

As used herein, "polysiloxane" means a compound having a backbone with two or more —SiO— groups. The siloxane groups represented by structure I above and containing the groups $R^1$, which is discussed above, and R, which is discussed below, can be branched or unbranched, and linear or cyclic. The siloxane groups can be substituted with pendant organic substituent groups, for example alkyl, aryl, and alkaryl groups. The organic substituent groups can be substituted with heteroatoms, for example oxygen, nitrogen, and halogen atoms, reactive functional groups, for example those reactive functional groups discussed above with reference to $R^2$, and mixtures of any of the foregoing.

In certain embodiments, each substituent group $R^2$ independently represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a malemide group, a fumarate group, an onium salt group such as a sulfonium group and an ammonium group, an anhydride group, a hydroxy alkylamide group, and an epoxy group; wherein m and n fulfill the requirements of $0<n<4$, $0<m<4$ and $2\leq(m+n)<4$.

The reactive functional groups of the polysiloxane can be thermally curable and/or curable by ionizing radiation or actinic radiation. The polysiloxane can comprise at least one functional group which is curable by thermal energy and at least one functional group which is curable by ionizing radiation or actinic radiation.

As used herein, "ionizing radiation" means high energy radiation or the secondary energies resulting from conversion of this electron or other particle energy to neutron or gamma radiation, said energies being at least 30,000 electron volts and can be 50,000 to 300,000 electron volts. While various types of ionizing irradiation are suitable for this purpose, such as X-ray, gamma and beta rays, the radiation produced by accelerated high energy electrons or electron beam devices is preferred. The amount of ionizing radiation in reds for curing compositions according to the present invention can vary based upon such factors as the components of the coating formulation, the thickness of the coating upon the substrate, the temperature of the coating composition and the like. Generally, a 1 mil (25 micrometers) thick wet film of a coating composition according to the present invention can be cured in the presence of oxygen through its thickness to a tack-free state upon exposure to from 0.5 to 5 megarads of ionizing radiation.

"Actinic radiation" is light with wavelengths of electromagnetic radiation ranging from the ultraviolet ("UV") light range, through the visible light range, and into the infrared range. Actinic radiation which can be used to cure coating compositions of the present invention generally has wavelengths of electromagnetic radiation ranging from 150 to 2,000 nanometers (nm), can range from 180 to 1,000 nm, and also can range from 200 to 500 nm. Examples of suitable ultraviolet light sources include mercury arcs, carbon arcs, low, medium or high pressure mercury lamps, swirl-flow plasma arcs and ultraviolet light emitting diodes. Preferred ultraviolet light-emitting lamps are medium pressure mercury vapor lamps having outputs ranging from 200 to 600 watts per inch (79 to 237 watts per centimeter) across the length of the lamp tube. Generally, a 1 mil (25 micrometers) thick wet film of a coating composition according to the present invention can be cured through its thickness to a tack-free state upon exposure to actinic radiation by passing the film at a rate of 20 to 1000 feet per minute (6 to 300 meters per minute) under four medium pressure mercury vapor lamps of exposure at 200 to 1000 millijoules per square centimeter of the wet film.

Useful radiation-curable groups which can be present as reactive functional groups on the polysiloxane include unsaturated groups such as vinyl groups, vinyl ether groups, epoxy groups, maleimide groups, fumarate groups and combinations of the foregoing. In certain embodiments, the UV curable groups can include acrylate groups, maleimides, fumarates, and vinyl ethers. Suitable vinyl groups include those having unsaturated ester groups and vinyl ether groups as discussed below.

The polysiloxane may alternatively have the following structure (II) or (III):

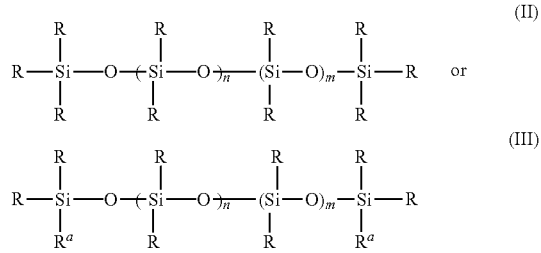

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^8$ comprises the following structure (IV):

—$R^3$—X (IV)

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as

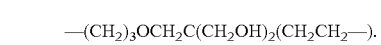

—$(CH_2)_3OCH_2C(CH_2OH)_2(CH_2CH_2$—).

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-α, α-dimethylbenzyl isocyanate, such as —$(CH_2)_2C_6H_4$— and —$CH_2CH(CH_3)C_6H_3(C(CH_3)_2(NCO)$. As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In certain embodiments, the substituent group $R^3$ represents an oxyalkylene group. In such embodiments, X may represent a group which comprises at least two reactive functional groups.

In certain embodiments, (n+m) in structure II ranges from 2 to 9, for example, from 2 to 3. In other embodiments, (n'+m') in structure III ranges from 2 to 9, for example, from 2 to 3.

In certain specific embodiments, X represents a group comprising at least one reactive functional group selected from a hydroxyl group and a carbamate group, or X represents a group which comprises at least two hydroxyl groups, or X represents a group which comprises at least one group selected from H, a monohydroxy-substituted organic group, and a group having the following structure (V):

wherein the substituent group $R^4$ represents $-CH_2-C-R^3$ when p is 2 and the substituent group $R^3$ represents a $C_1$ to $C_4$ alkylene group, or the substituent group $R^4$ represents $-CH_2-C-$ when p is 3, wherein at least a portion of X represents a group having the structure (V). In another embodiment, the present invention is directed to any cured composition as previously described wherein m is 2 and p is 2.

In certain embodiments, the polysiloxane is the reaction product of at least the following reactants: (i) at least one polysiloxane of the formula (VI):

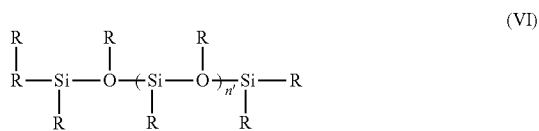

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5, such that the percent of SiH content of the polysiloxane ranges from 2 to 50 percent, and can range from 5 to 25 percent; and (ii) at least one molecule which comprises at least one functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group and at least one unsaturated bond capable of undergoing a hydrosilylation reaction. In another embodiment, the at least one functional group is selected from hydroxyl groups.

It should be appreciated that the various R groups can be the same or different, and, in certain embodiments, the R groups will be entirely monovalent hydrocarbon groups or will be a mixture of different groups such as monovalent hydrocarbon groups and hydroxyl groups.

This reaction product may be ungelled. As used herein, "ungelled" refers to a reaction product that is substantially free of crosslinking and has an intrinsic viscosity when dissolved in a suitable solvent, as determined, for example in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from Emerald Performance Materials as MASILWAX BASE® 135.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane (polysiloxane polyol) can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example CARDURA E available from Shell Chemical Co., and mixtures of any of the foregoing.

In certain embodiments, the polysiloxane is a carbamate functional group-containing polysiloxane which comprises the reaction product of at least the following reactants:
(i) at least one polysiloxane containing silicon hydride of structure (VI) above where R and n' are as described above for that structure;
(ii) at least one hydroxyl functional group-containing material having one or more unsaturated bonds capable of undergoing hydrosilylation reaction as described above; and
(iii) at least one low molecular weight carbamate functional material, comprising the reaction product of an alcohol or glycol ether and a urea.

Examples of such "low molecular weight carbamate functional material" include, but are not limited to, alkyl carbamate and hexyl carbamates, and glycol ether carbamates described in U.S. Pat. Nos. 5,922,475 and 5,976,701, which are incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane and the original alcohol or glycol ether. Reaction conditions and the ratio of reactants (i), (i) and (iii) are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

As aforementioned, in addition to or in lieu of hydroxyl and/or carbamate functional groups, the polysiloxane can comprise one or more other reactive functional groups such as carboxyl groups, isocyanate groups, blocked isocyanate groups, carboxylate groups, primary amine groups, secondary amine groups, amide groups, urea groups, urethane groups, epoxy groups, and mixtures of any of the foregoing.

When the polysiloxane contains carboxyl functional groups, it can be prepared by reacting at least one polysiloxane containing hydroxyl functional groups as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where at least one polysiloxane contains one or more isocyanate functional groups, the polysiloxane can be prepared by reacting at least one polysiloxane containing hydroxyl functional groups as described above with a polyisocyanate, such as a diisocyanate. Nonlimiting examples of suitable polyisocyanates include aliphatic polyisocyanates, such as, for example aliphatic diisocyanates, for example 1,4-tetramethylene diisocyanate and 1,6-hexamethylene diisocyanate; cycloaliphatic polyisocyanates, for example 1,4-cyclohexyl diisocyanate, isophorone diisocyanate, and α,α-xylylene diisocyanate; and aromatic polyisocyanates, for example 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Reaction conditions and the ratio of reactants are selected so as to form the desired functional groups.

The substituent group X in structure (IV) can comprise a polymeric urethane or urea-containing material which is terminated with isocyanate, hydroxyl, primary or secondary amine functional groups, or mixtures of any of the foregoing. When the substituent group X comprises such functional groups, the polysiloxane can be the reaction product of at least one polysiloxane polyol as described above, one or more polyisocyanates and, optionally, one or more compounds having at least two active hydrogen atoms per molecule selected from hydroxyl groups, primary amine groups, and secondary amine groups.

Nonlimiting examples of suitable polyisocyanates are those described above. Nonlimiting examples of compounds having at least two active hydrogen atoms per molecule include polyols and polyamines containing primary and/or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-propylene diamine, 1,8-octane diamine, isophorone diamine, propane-2,2-cyclohexyl amine, and the like. Suitable aromatic diamines include phenylene diamines and the toluene diamines, for example o-phenylene diamine and p-tolylene diamine. These and other suitable polyamines are described in detail in U.S. Pat. No. 4,046,729 at column 6, line 61 to column 7, line 26, Incorporated herein by reference.

In certain embodiments, the substituent group X of the structure (IV) can comprise a polymeric ester-containing group which is terminated with hydroxyl or carboxylic acid functional groups. When X is such a group, at least one polysiloxane can be the reaction product of one or more polysiloxane polyols as described above, one or more materials having at least one carboxylic acid functional group, and one or more organic polyols. Nonlimiting suitable examples of materials having at least one carboxylic acid functional group include carboxylic acid group-containing polymers well-known in the art, for example carboxylic acid group-containing acrylic polymers, polyester polymers, and polyurethane polymers, such as those described in U.S. Pat. No. 4,681,811. Nonlimiting examples of suitable organic polyols include those described above.

To form the polysiloxane containing epoxy groups, at least one polysiloxane containing hydroxyl functional groups as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer having at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

The amount of the polysiloxane present in the polymeric binder (a) generally ranges from 10 to 100 percent by weight, such as 10 to 90 percent by weight, or 20 to 80 percent by weight, or 40 to 60 percent by weight, based on the total weight of resin solids (al polymers containing functional groups) in the polymeric binder (a). Often the polysiloxane is present in the polymeric binder (a) in an amount of 90 percent by weight, with the remainder comprising at least one additional polymeric resin different from the polysiloxane, described below.

Dispersed in the polysiloxane are protonated silica particles. Such protonated silica particles may be prepared by contacting the particles with an aqueous solution of a mineral or organic acid (non-limiting examples include HCl, acetic acid, or p-toluenesulfonic acid) for a time sufficient to render the particles silanol functional.

The silica particles have an average particle size of 2 to 20 microns, often 2 to 15 microns, more often 7 to 12 microns, prior to incorporation into the curable film-forming composition. The particles may range between any combination of these values inclusive of the recited values. These particle sizes are significantly larger (often at least one hundred and even one thousand times larger) than those of silica particles conventionally used in coating compositions, which are typically nanoparticles. These ultra-small particles yield very high gloss coatings. The larger particle sizes of the silica used in the compositions of the present invention contribute to the desired matte finish of the compositions ("low gloss"; i.e., 85° gloss less than 30), and also provide burnish resistance. Such particles are typically present in the polysiloxane in an amount of 5 to 20 percent by weight, often 10 to 15 percent by weight, based on the total weight of solids in the polysiloxane/silica mixture. The silica particles are therefore present in the curable film-forming composition in an amount of 1 to 15 percent by weight, often 1 to 10 percent by weight, more often 3 to 5 percent by weight based on the total weight of solids in the curable film-forming composition.

Prior to protonation, the silica particles are typically precipitated or fumed silica, and are untreated particles. A particularly suitable fumed silica that may be protonated and dispersed in the polysiloxane is ACEMATT TS 100, available from Evonik Industries AG.

The polymeric binder (a) in the curable film-forming compositions of the present invention further optionally comprises (ii) at least one additional polymeric resin different from the polysiloxane (i) and having reactive functional groups. This additional resin is often selected from polyester resins, acrylic resins, and combinations thereof. Reactive functional groups include any of those disclosed above with respect to the polysiloxane (i).

Suitable polyesters may be prepared in any known manner, for example, by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, which is often used, and trimellitic acid. Dimerized fatty acids may also be used to prepare soft polyester resins. Besides the polycarboxylic acids mentioned above, functional equivalents of the acids such as anhydrides where they exist or lower alkyl esters of the acids such as the methyl esters may be used.

As noted above, the additional polymeric resin (ii) may comprise an acrylic polymer. Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 5 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as 2,2-bis(hydroxymethyl) propionic acid (DMPA), isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

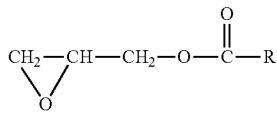

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference. Other useful carbamate functional monomers are disclosed in U.S. Pat. No. 5,098,947, which is incorporated herein by reference.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Generally any method of producing acrylic polymers that is known to those skilled in the art utilizing art recognized amounts of monomers can be used.

In particular embodiments of the present invention, the additional polymeric resin comprises a mixture of two hydroxyl functional acrylic polymers. The first comprises a polymerization product of styrene, hydroxypropyl acrylate, isostearic acid, glycidyl methacrylate, and methyl methacrylate as referenced in U.S. Pat. No. 5,869,566 Examples 1-16 which is incorporated herein by reference while the second comprises a polymerization product of hydroxypropyl methacrylate, methyl methacrylate, n-butyl acrylate, styrene, Cardura E/acrylic acid adduct, and acrylic acid according to U.S. Pat. No. 6,458,885 which is incorporated herein by reference and the two are mixed in a weight ratio in the range of 1:1 to 3:1, respectively.

When used, the separate polymeric resin (ii) is typically present in the polymeric binder in an amount of 10 to 90 percent by weight, such as 20 to 80 percent by weight, or 40 to 60 percent by weight, based on the total weight of resin solids (all polymers containing functional groups) in the polymeric binder (a). Often the additional polymeric resin is present in the polymeric binder (a) and constitutes an amount of up to 10 percent by weight, with the remainder comprising the polysiloxane (i).

The curable film-forming compositions of the present invention further comprise a curing agent (b) comprising functional groups that are reactive with the reactive functional groups of (i), (ii), or both. The curing agent (b) may be selected from, for example, polyisocyanates and aminoplasts. Mixtures of curing agents may also be used.

Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol.

The polyisocyanate which is utilized as a crosslinking agent can be prepared from a variety of isocyanate-containing materials. Often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethylpyrazole.

Alternatively, the curing agent (b) comprises a polyisocyanate having free isocyanate functional groups and the curable film-forming composition is a two-package system.

The polyisocyanate may include a single trifunctional polyisocyanate or a mixture of two or more different trifunctional polyisocyanates, and may be selected from one or more polyisocyanates such as triisocyanates including isocyanurates.

Suitable trifunctional isocyanates include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, Inc., DESMODUR N 3300, which is the isocyanurate of hexamethylene diisocyanate, DESMODUR N 3600, which is a trimer of hexamethylene diisocyanate, and DESMODUR Z 4470, a trimer of isophorone diisocyanate, all available from Bayer Corporation. Trimers of hexamethylene diisocyanate are used most often.

The polyisocyanate may also be any of those disclosed above, chain extended with one or more polyamines and/or polyols using suitable materials and techniques known to those skilled in the art.

The amount of the curing agent (b) generally ranges from 10 to 90 percent by weight, or 20 to 80 percent by weight, or 30 to 60 percent by weight, based on the total weight of resin solids (curing agent plus all polymers containing functional groups) in the film-forming composition.

Other optional ingredients, such as colorants, catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from 0.1 to 5 percent by weight based on total weight of resin solids of the film-forming composition. When the composition of the present invention includes aminoplast curing agents, catalysts including acid functional catalysts known to those skilled in the art as useful in aminoplast-cured compositions, such as para-toluenesulfonic acid, dodecylbenzene sulfonic acid, and the like, may be included as well.

The curable film-forming compositions of the present invention are most often used as matte finish, colorless topcoats (clear coats) over colored base coats, but can also include a colorant and be applied as a monocoat. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. When present, the colorant may comprise from 1 to 65 weight percent of the present compositions, such as from 3 to 40 weight percent or 5 to 35 weight percent, with weight percent based on the total weight of the compositions.

The curable film-forming compositions of the present invention may contain color pigments conventionally used in surface coatings and may be used as matte finish or "low gloss" monocoats; that is, low gloss pigmented coatings. By "low gloss" it is meant that the cured coating has an initial 85° gloss measurement of less than 30, often less than 20, as measured by standard techniques known to those skilled in the art. Such standard techniques include ASTM D523 for gloss measurement.

The curable film-forming compositions of the present invention may alternatively be used as a matte finish clear coat layer of a multi-layer composite coating composition, such as a color-plus-clear composite coating, as noted below.

The curable film-forming compositions of the present invention may be curable at ambient temperatures or elevated temperatures, depending on the crosslinking chemistry employed. The film-forming compositions of the present invention are most suitable as topcoats, in particular, clear coats and monocoats, by virtue of their matte finish and burnish-resistant properties as discussed below. The compositions may be easily prepared by simple mixing of the ingredients, using formulation techniques well known in the art.

The compositions of the present invention may be applied over any of a variety of substrates such as metallic, glass, wood, and/or polymeric substrates, and can be applied by conventional means including but not limited to brushing, dipping, flow coating, spraying and the like. They are most often applied by spraying. The usual spray techniques and equipment for air spraying, airless spraying, and electrostatic spraying employing manual and/or automatic methods can be used. Suitable substrates include but are not limited to metal substrates such as ferrous metals, zinc, copper, magnesium, aluminum, aluminum alloys, and other metal and alloy substrates typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions of the present invention may also be applied over elastomeric, plastic, or composite substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate consisting of fibers, typically of glass or carbon, or other filler material that is incorporated with polymeric or plastic materials, commonly of epoxy type polymers.

The curable film-forming composition of the present invention can be applied to the substrate or on top of a basecoat by any conventional coating technique, including, but not limited to, any of those disclosed above. The transparent topcoat can be applied to a cured or to a dried basecoat before the basecoat has been cured. In the latter instance, the two coatings can then be heated to cure both coating layers simultaneously.

The curable film-forming compositions of the present invention, after being applied to a substrate as a coating and after curing, demonstrate an initial 85° gloss of less than 30, such as less than 20 or less than 10, and an increase in 85° gloss of no more than 10 gloss units, or no more than 5 gloss units, when subjected to WET ABRASION TEST METHOD ONE. Alternatively, the curable film-forming compositions of the present invention demonstrate an increase in 85° gloss of no more than 50 percent compared to the initial value, such as no more than 25 percent, or no more than 10 percent, when subjected to WET ABRASION TEST METHOD ONE. In certain embodiments of the present invention, the curable film-forming compositions will even demonstrate a decrease in gloss after subjection to the abrasion test. The percent change in gloss may be calculated as follows:

$$\text{Percent change} = (G_{final} - G_{initial})/G_{initial} * 100$$

wherein $G_{final}$ is the 85° gloss measured after the abrasion test and $G_{initial}$ is the 85° gloss measured before the abrasion test Additionally, in certain embodiments of the present invention, the curable film-forming compositions of the present invention, after being applied to a substrate as a coating and after curing, demonstrate an initial 85° gloss of less than 30, such as less than 20 or less than 10, and an increase in 85° gloss of no more than 10 gloss units, or no more than 5 gloss units, when subjected to WET ABRASION TEST METHOD TWO. Alternatively, the curable film-forming compositions of the present invention demonstrate an increase in 85° gloss of no more than 50 percent compared to the initial value, such as no more than 25 percent, or no more than 10 percent, when subjected to WET ABRASION TEST METHOD TWO. In certain embodiments of the present invention, the curable film-forming compositions will even demonstrate a decrease in gloss after subjection to the abrasion test.

Each of the WET ABRASION TEST METHODS ONE and TWO corresponds, respectively, to the Amtec-Kistler Car Wash Test DIN 55668, run at 10 or 40 cycles, respectively. In the WET ABRASION TESTS ONE and TWO, a cured coating on a substrate is subjected to testing by first measuring the 85° gloss of the coating ("original gloss"). The coating is then subjected to the Amtec-Kistler Car Wash Test DIN 55668, run at 10 or 40 cycles, and afterward, the 85° gloss is again measured.

The curable film-forming compositions of the present invention, after being applied to a substrate as a coating and after curing, demonstrate an initial 85° gloss of less than 30, such as less than 20 or less than 10, and an increase in 85° gloss of no more than 10 gloss units, or no more than 5 gloss units, when subjected to DRY ABRASION TEST METHOD ONE. Alternatively, the curable film-forming compositions of the present invention demonstrate an increase in 85° gloss of no more than 50 percent, such as no more than 25 percent, when subjected to DRY ABRASION TEST METHOD ONE.

Additionally, in certain embodiments of the present invention, the curable film-forming compositions of the present invention, after being applied to a substrate as a coating and after curing, demonstrate an initial 85° gloss of less than 30, such as less than 20 or less than 10, and an increase in 85° gloss of no more than 10 gloss units, or no more than 5 gloss units, when subjected to DRY ABRASION TEST METHOD TWO. Alternatively, the curable film-forming compositions of the present invention demonstrate an increase in 85° gloss of no more than 55 percent, such as no more than 25 percent, when subjected to DRY ABRASION TEST METHOD TWO.

Each of the DRY ABRASION TEST METHODS ONE and TWO are carried out such that the coating is linearly scratched with a weighted abrasive paper for ten double rubs using an Atlas AATCC CROCKMETER, Model CM-5, available from Atlas Electric Devices Company of Chicago, Ill. The abrasive paper used is 3M 281Q WETORDRY™ PRODUCTION™ 2 and 9 micron polishing paper sheets for DRY ABRASION TEST METHODS ONE and TWO respectively, which are commercially available from 3M Company of St. Paul, Minn. In the DRY ABRASION TESTS ONE and TWO, a cured coating on a substrate is subjected to testing by first measuring the 85° gloss of the coating ("original gloss"). The coating is then subjected to DRY ABRASION TESTS ONE and TWO, and afterward, the 85° gloss is again measured.

Given their unique properties, the curable film-forming compositions of the present invention are particularly suitable for use in a method of improving burnish resistance of a substrate in accordance with the present invention. The method comprises: (1) applying to the substrate a curable film-forming composition to form a coated substrate, and (2) (a) heating the coated substrate to a temperature and for a time sufficient to cure the curable film-forming composition or (b) allowing a time sufficient to cure the curable film-forming composition under ambient conditions. The curable film-forming composition comprises any of those described above and forms the outermost layer, or topcoat, on the coated substrate.

The present invention is more particularly described in the following examples, which are intended to be illustrative only, since numerous modifications and variations therein will be apparent to those skilled in the art. Unless otherwise specified, all parts and percentages are by weight.

EXAMPLE A

This example describes the preparation of polysiloxane polyol, a product of the hydrosilylation of pentasiloxane with an approximate degree of polymerization of 3 to 4, i.e., $(Si—O)_3$ to $(Si—O)_4$. The polysiloxane polyol was prepared from the following mixture of ingredients:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm-1).

EXAMPLE B

This example describes the preparation of a protonated silica dispersion in a polysiloxane. 25 g of ACEMATT TS100 (available from Evonik Industries AG) was mixed with 250 g of methanol in a four-neck round bottom flask equipped with a mechanical stirrer. While stirring, HCl acid was added until the viscosity of the mixture was markedly reduced and the pH was less than 1. After stirring for one hour the mixture was filtered using a Buchner funnel, rinsed with methanol and then allowed to dry at 120° F. overnight. The protonated silica was then mixed with 256 g methanol and stirred for 30 min in a four-neck round bottom flask equipped with a mechanical stirrer, temperature probe, reflux condenser, addition funnel, vacuum outlet and a nitrogen inlet. Then the 144 g of the polysiloxane polyol, as described above, was added to the methanol/silica mixture. Upon completion of the polysiloxane addition 163.38 g of methyl isobutyl ketone was added and the entire mixture was stirred for 45 min. The mixture was then heated to 30° C. and vacuum applied to remove methanol. After the desired amount of methanol was removed the mixture was heated to 80° C. for one hour. The resultant dispersion of silica in siloxane was approximately 48% solids.

Example 1 demonstrates the preparation of curable film-forming compositions according to the present invention. The compositions were prepared by first mixing the separate packs of ingredients, and then combining the packs immediately prior to application to the substrates.

EXAMPLE 1

| Ingredient | Weight (g) |
| --- | --- |
| A-Pack | |
| EVERSORB 74[1] | 0.45 |
| EVERSORB 93L[1] | 0.6 |
| BYK 300[2] | 0.2 |
| ADDITOL VXL 4930[3] | 0.06 |
| Dibutyl tin dilaurate | 0.02 |
| D871[4] | 10.0 |
| Acrylic Polyol 1[5] | 3.82 |
| Acrylic Polyol 2[6] | 2.20 |
| Siloxane/silica dispersion[7] | 24.0 |
| B-Pack | |
| DESMODUR N-3600[8] | 13.7 |

[1]Available from Everlight Chemical Industrial Corp.
[2]Available from Byk Chemie
[3]Available from Cytec Industries Inc.
[4]Solvent blend available from PPG Industries, Inc.
[5]Solventborne acrylic polyol consisting of styrene, hydroxypropyl acrylate, isostearic acid, glycidyl methacrylate, and methyl methacrylate
[6]Solventborne acrylic polyol consisting of hydroxypropyl methacrylate, methyl methacrylate, n-butyl methacrylate, styrene, Cardura E/acrylic acid adduct, and acrylic acid
[7]As described above in Example B
[8]Available from Bayer MaterialScience The film forming composition of Example 1 was spray applied to a pigmented basecoat to form color-plus-clear composite coatings over primed electrocoated steel panels. The panels used were ACT cold roll steel panels (10.16 cm by 30.48 cm) with ED6060 electrocoat available from ACT Laboratories, Inc. Separate panels were coated with an ENVIROBASE High Performance (EHP) pigmented waterborne basecoat, available from PPG Industries, Inc. Black EHP T407 was hand sprayed using a SATAjet 3000 with WSB fluid nozzle at ambient temperature (about 70° F. (21° C.)). A dry film thickness of about 0.3 to 0.8 mils (about 7 to 20 micrometers) was targeted for the basecoat. The basecoat panels were allowed to flash at ambient temperature (about 70° F. (21° C.)) for at least 15 minutes prior to clearcoat application.

The coating compositions were each hand sprayed using a Devilbiss GTi HVLP spray gun to a basecoated panel at ambient temperature in two coats with an ambient flash between applications. Clearcoats were targeted for a 1 to 2 mils (about 25 to 51 micrometers) dry film thickness. All coatings were allowed to cure at ambient temperature or air flash for about 20 minutes before being baked. The optional bake was for thirty minutes at 140° F. (60° C.). Seven days after clearcoat application, the coated panels were subjected to DRY ABRASION TEST METHOD ONE and TWO and WET ABRASION TEST METHODS ONE and TWO to determine burnish resistance. Table 1 below illustrates the WET ABRASION TEST METHOD results and Table 2 Illustrates the DRY ABRASION TEST METHOD results for the curable film-forming composition of Example 1.

TABLE 1

| Coating | Original 85° Gloss | Gloss after WET ABRASION TEST METHOD ONE (% increase) | Gloss after WET ABRASION TEST METHOD TWO (% increase) |
| --- | --- | --- | --- |
| Example 1A[1] | 7.2 | 7.5 (4.2%) | 7.1 (−1.4%) |
| Example 1B[1] | 9.6 | 11 (14.6%) | 10.7 (11.5%) |

[1]Example 1A and 1B are two separate replicates of Example 1

TABLE 2

| Coating | Original 85° Gloss | Gloss after DRY ABRASION TEST METHOD ONE (% increase) | Gloss after DRY ABRASION TEST METHOD TWO (% increase) |
| --- | --- | --- | --- |
| Example 1A[1] | 7.2 | 7.7 (6.9%) | 8.3 (15.3%) |
| Example 1B[1] | 9.6 | 13.1 (36.4%) | 14.6 (52.1%) |

[1]Example 1A and 1B are two separate replicates of Example 1

Data in the tables indicate that the curable film-forming compositions of the present invention demonstrate excellent burnish resistance. The Example coatings show a gloss increase of less than 2 gloss units for either WET ABRASION TEST METHOD. Also, the Example coatings show a gloss increase of 5 gloss units or less for either DRY ABRASION TEST METHOD.

The present invention has been described with reference to specific details of particular embodiments thereof. It is not intended that such details be regarded as limitations upon the scope of the invention except insofar as and to the extent that they are included in the accompanying claims.

We claim:
1. A curable film-forming composition comprising:
(a) a polymeric binder comprising:
  (i) a polysiloxane having reactive functional groups and in which is dispersed protonated silica particles having an average particle size of 2 to 20 microns, wherein the polysiloxane is present in the polymeric binder in an amount of at least 10 percent by weight based on the total weight of solids in the polymeric binder; and
  (ii) optionally at least one additional polymeric resin different from the polysiloxane (i), having reactive functional groups; and
(b) a curing agent containing functional groups that are reactive with the reactive functional groups of (i), (ii), or both;
wherein after application of the curable film-forming composition to a substrate as a coating and after curing to yield a cured coating, the cured coating demonstrates an initial 85° gloss of less than 30 and an increase in 85° gloss of no more than 10 gloss units when subjected to WET ABRASION TEST METHOD ONE.

2. The curable film-forming composition of claim 1 wherein the protonated silica particles are present in the polysiloxane in an amount of 3 to 15 percent by weight, based on the total weight of solids in the polysiloxane.

3. The curable film-forming composition of claim 1 wherein the polysiloxane comprises a polysiloxane polyol.

4. The curable film-forming composition of claim 1, wherein the additional polymeric resin (ii) is present and the reactive functional groups of (ii) are selected from the group consisting of hydroxyl groups, carbamate groups, carboxyl groups, isocyanate groups, carboxylate groups, primary amine groups, secondary amine groups, amide groups, urea groups, urethane groups, epoxy groups, and combinations thereof.

5. The curable film-forming composition of claim 4, wherein the polymeric resin of (ii) comprises at least one hydroxyl functional acrylic and/or polyester polymer.

6. The curable film-forming composition of claim 1, wherein the curing agent of (b) is selected from the group consisting of polyisocyanates, aminoplasts, and combinations thereof.

7. The curable film-forming composition of claim 6, wherein the curing agent of (b) comprises a polyisocyanate having free isocyanate functional groups and the curable film-forming composition is a two-package system.

8. The curable film-forming composition of claim 1, wherein the polysiloxane is present in the polymeric binder in an amount of 10 to 90 percent by weight, based on the total weight of solids in the polymeric binder.

9. The curable film-forming composition of claim 1 wherein after application of the curable film-forming composition to a substrate as a coating and after curing to yield a cured coating, the cured coating demonstrates an initial 85° gloss of less than 30 and an increase in 85° gloss of no more than 5 gloss units when subjected to WET ABRASION TEST METHOD ONE.

10. A curable film-forming composition comprising:
(a) a polymeric binder comprising:
(i) a polysiloxane having reactive functional groups and in which is dispersed protonated silica particles having an average particle size of 2 to 20 microns, wherein the polysiloxane is present in the polymeric binder in an amount of at least 10 percent by weight based on the total weight of solids in the polymeric binder; and
(ii) optionally, at least one additional polymeric resin different from the polysiloxane (i), having reactive functional groups; and
(b) a curing agent containing functional groups that are reactive with the reactive functional groups of (i), (ii), or both;
wherein after application of the curable film-forming composition to a substrate as a coating and after curing to yield a cured coating, the cured coating demonstrates an initial 85° gloss of less than 30 and an increase in 85° gloss of no more than 10 gloss units when subjected to WET ABRASION TEST METHOD TWO.

11. A method of improving burnish resistance of a substrate, comprising: (1) applying to the substrate a curable film-forming composition to form a coated substrate, and (2) heating the coated substrate, if necessary, to a temperature and for a time sufficient to cure the curable film-forming composition and yield a cured coating; wherein said curable film-forming composition comprises:
(a) a polymeric binder comprising:
(i) a polysiloxane having reactive functional groups and in which is dispersed protonated silica particles having an average particle size of 2 to 20 microns, wherein the polysiloxane is present in the polymeric binder in an amount of at least 10 percent by weight based on the total weight of solids in the polymeric binder; and
(ii) optionally, at least one additional polymeric resin different from the polysiloxane (i), having reactive functional groups; and
(b) a curing agent containing functional groups that are reactive with the reactive functional groups of (i), (ii), or both;
wherein after curing, the cured coating demonstrates an initial 85° gloss of less than 30 and an increase in 85° gloss of no more than 10 gloss units when subjected to WET ABRASION TEST METHOD ONE.

12. The method of claim 11 wherein the protonated silica particles are present in the polysiloxane in an amount of 3 to 15 percent by weight, based on the total weight of solids in the polysiloxane.

13. The method of claim 11 wherein the polysiloxane comprises a polysiloxane polyol.

14. The method of claim 11, wherein the polymeric resin of (ii) is present and the reactive functional groups of (ii) are selected from the group consisting of hydroxyl groups, carbamate groups, carboxyl groups, isocyanate groups, carboxylate groups, primary amine groups, secondary amine groups, amide groups, urea groups, urethane groups, epoxy groups, and combinations thereof.

15. The method of claim 14, wherein the polymeric resin of (ii) comprises at least one hydroxyl functional acrylic and/or polyester polymer.

16. The method of claim 11, wherein the curing agent of (b) is selected from the group consisting of polyisocyanates, aminoplasts, and combinations thereof.

17. The method of claim 16, wherein the curing agent of (b) comprises a polyisocyanate having free isocyanate functional groups and the curable film-forming composition is a two-package system.

18. The method of claim 11, wherein the polysiloxane is present in the polymeric binder in an amount of 10 to 90 percent by weight, based on the total weight of solids in the polymeric binder.

19. The method of claim 11 wherein after application of the curable film-forming composition to a substrate as a coating and after curing, the cured coating demonstrates an initial 85° gloss of less than 30 and an increase in 85° gloss of no more than 5 gloss units when subjected to WET ABRASION TEST METHOD ONE.

20. A method of improving burnish resistance of a substrate, comprising: (1) applying to the substrate a curable film-forming composition to form a coated substrate, and (2) heating the coated substrate, if necessary, to a temperature and for a time sufficient to cure the curable film-forming composition and yield a cured coating; wherein said curable film-forming composition comprises:
(a) a polymeric binder comprising:
(i) a polysiloxane having reactive functional groups and in which is dispersed protonated silica particles having an average particle size of 2 to 20 microns, wherein the polysiloxane is present in the polymeric binder in an amount of at least 10 percent by weight based on the total weight of solids in the polymeric binder; and
(ii) optionally, at least one additional polymeric resin different from the polysiloxane (i), having reactive functional groups; and
(b) a curing agent containing functional groups that are reactive with the reactive functional groups of (i), (ii), or both;

wherein after curing, the cured coating demonstrates an initial 85° gloss of less than 30 and an increase in 85° gloss of no more than 10 gloss units when subjected to WET ABRASION TEST METHOD TWO.

* * * * *